US010758880B2

United States Patent
Collins, Jr. et al.

(10) Patent No.: US 10,758,880 B2
(45) Date of Patent: Sep. 1, 2020

(54) ACID DIGESTION INSTRUMENT AND VESSEL SYSTEM

(71) Applicant: CEM Corporation, Matthews, NC (US)

(72) Inventors: Michael J. Collins, Jr., Charlotte, NC (US); Joseph J. Lambert, Charlotte, NC (US); Matt Beard, Huntersville, NC (US); Dwight D. Watkins, Monroe, NC (US); Timothy A. Zawatsky, Matthews, NC (US); Taylor M. Hostak, Charlotte, NC (US)

(73) Assignee: CEM Corporation, Matthews, NC (US)

(*) Notice: Subject to any disclaimer, the term of this patent is extended or adjusted under 35 U.S.C. 154(b) by 230 days.

(21) Appl. No.: 15/586,752

(22) Filed: May 4, 2017

(65) Prior Publication Data

US 2017/0320032 A1    Nov. 9, 2017

Related U.S. Application Data

(60) Provisional application No. 62/331,590, filed on May 4, 2016.

(51) Int. Cl.
| | |
|---|---|
| *B01J 19/00* | (2006.01) |
| *B01J 3/03* | (2006.01) |
| *B01J 3/00* | (2006.01) |
| *G01N 1/40* | (2006.01) |
| *H05B 6/80* | (2006.01) |
| *B01J 3/04* | (2006.01) |

(Continued)

(52) U.S. Cl.
CPC .............. *B01J 3/03* (2013.01); *B01J 3/002* (2013.01); *B01J 3/042* (2013.01); *B01L 3/50825* (2013.01); *B01L 7/00* (2013.01); *G01N 1/4044* (2013.01); *H05B 6/806* (2013.01); *B01J 2219/0027* (2013.01); *B01J 2219/02* (2013.01); *B01L 9/06* (2013.01); *B01L 2300/041* (2013.01); *B01L 2300/0854* (2013.01); *B01L 2300/14* (2013.01); *G01N 1/44* (2013.01)

(58) Field of Classification Search
CPC ................................ G01N 1/4044; B01L 7/00
USPC ......................................... 422/186, 138, 146
See application file for complete search history.

(56) References Cited

U.S. PATENT DOCUMENTS

| | | |
|---|---|---|
| 6,086,826 A | 7/2000 | Thomas |
| 6,136,276 A | 10/2000 | Hargett |

(Continued)

FOREIGN PATENT DOCUMENTS

| | | |
|---|---|---|
| CN | 104056584 | 9/2014 |
| DE | 10016962 | 2/2002 |

OTHER PUBLICATIONS

Griepink, "Sample digestion for the determination of elemental traces and matrices of environmental concern," Pure and Applied Chemistry, 1989, vol. 61, No. 6, pp. 1139-1146.

*Primary Examiner* — Natalia Levkovich
(74) *Attorney, Agent, or Firm* — Summa PLLC

(57) ABSTRACT

An instrument system for acid digestion is disclosed. The instrument includes a heating block, a reaction vessel formed of a polymer that is resistant to acid and other chemical attack at temperatures above 150° C. and that has a structure (thickness, etc.) sufficient to withstand pressures above atmospheric, a metal sleeve surrounding the polymeric reaction vessel, and an opening in the block that has a cross-section corresponding to the cross-section of the metal sleeve.

16 Claims, 10 Drawing Sheets

(51) Int. Cl.
  *B01L 3/00* (2006.01)
  *B01L 7/00* (2006.01)
  *B01L 9/06* (2006.01)
  *G01N 1/44* (2006.01)

(56) References Cited

U.S. PATENT DOCUMENTS

| | | |
|---|---|---|
| 6,287,526 B1 | 9/2001 | Hargett, Jr. |
| 6,534,140 B2 | 3/2003 | Hargett |
| 6,607,920 B2 | 8/2003 | Jennings |
| 6,863,871 B2 | 3/2005 | Hargett |
| 7,829,040 B2 | 11/2010 | Hargett |
| 8,795,608 B2 | 8/2014 | Hargett |
| 8,852,533 B2 | 10/2014 | Hargett |
| 9,237,608 B2 | 1/2016 | Barclay |
| 2001/0022949 A1 | 9/2001 | Hargett |
| 2004/0251253 A1 | 12/2004 | Zenter |
| 2013/0125673 A1* | 5/2013 | Kanipayor ............... B01L 3/04 73/863.11 |
| 2013/0302220 A1 | 11/2013 | Hargett |
| 2015/0093308 A1 | 4/2015 | Zentner |

* cited by examiner

ACID DIGESTION INSTRUMENT AND VESSEL SYSTEM

BACKGROUND

The present invention relates to acid digestion for chemical analysis.

Acid digestion is a well understood technique for obtaining elements from compounds, various matrices that include compounds (soil), manufactured products, food products, or many other materials for which the presence and amount of one or more particular elements is of interest. The goal of digestion is to convert all element-containing species into a single form that is uniform and well defined (e.g., ions).

Uses include environmental testing of objects and structures or matrices, both natural and man-made. Examples include (but are not limited to) elements present in rocks, plant, soil, food, pharmaceuticals, plastics, or metals.

Digestion is appropriate for such elements that by virtue of composition or physical state, are not immediately susceptible to solution in water or organic solvents. Stated differently, samples that are fully soluble in water or simple organic solvents can usually be analyzed without acid digestion.

Digestion is either helpful or necessary for materials that require a significant chemical decomposition before individual elements can be identified in a solution that can be introduced into an analyzer. For total content (elemental) measurements, the digestion technique must, in combination with the chosen measurement method, allow a determination of the total element content. In a broad sense, the term "digestion" can refer to several types of techniques, including both combustion ("ashing") and fusion (e.g., alkaline fusion). Acid digestion uses one or more strong mineral acids, often at elevated temperatures, pressure, or both, to attack the structure or matrix and reduce it to its elements. The acids must avoid contributing unwanted elements to the sample and thus should be relatively easy to purify. Within these parameters appropriate acids thus often include perchloric ($HClO_4$), chloric ($HClO_3$), hydrochloric (HCL), hydrofluoric (HF), nitric ($HNO_3$), and sulfuric ($H_2SO_4$).

See, for example, Grepink, "Sample digestion for the determination of elemental traces and matrices of environmental concern," Pure and Applied Chemistry, Vol. 61, No. 6, pp 1139-1146 (1989).

Ideally, acid digestion produces a colorless solution of ions or elements in the acid. At that point the acid solution can be cooled (if necessary) and then diluted to a concentration appropriate for the desired analytical technique. Helpful and well understood analytical techniques (particularly in the case of elemental analysis) include atomic absorption (AA) or emission (AE) spectroscopy, inductively coupled plasma (ICP), inductively coupled plasma with mass spectroscopy (ICP-MS), titration, and related tests.

Depending upon the matrix or item that the acid must attack, in some cases the digestion must be carried out in the strong mineral acids at an elevated temperature. If the required temperature is above the boiling point of the acid(s), the digestion reaction must take place in a closed vessel that will support the pressures generated at the elevated temperature.

The digestion vessel can be either helpful or problematic. In trace element analysis the vessel material must be selected to avoid both cross-contamination and losses by absorption. Fluorinated hydrocarbon polymers such as polytetrafluorethylene (PTFE) are stable and inert, but cannot withstand (at reasonable sizes) high pressure, and can gradually increase in surface area (and thus increase the potential for adsorption of some of the sample) after use. Glass and quartz-glass have some favorable properties, but are inappropriate for a silica containing matrix (which is typical in soils, rocks, plants and coal, for example) that may require digestion in HF.

CEM Corporation, the equitable and record owner of the present invention (has advanced the field of digestion significantly over several decades with products including (but not limited to) MARS6™, DISCOVER™, SP-D™, AND STAR™. These use the application of microwave energy in sealed or open vessels to carry out successful digestion faster, more conveniently, and at higher temperatures and pressures. CEM vessels include a number of advantageous features including chemical resistance and safety. U.S. Pat. Nos. 6,086,826; 6,136,276; 6,534,140; 6,287,526; 7,829,040; 8,795,608 (the illustrated vessel); and U.S. Pat. No. 9,237,608 are exemplary, but certainly not an exhaustive list. The capability of these instruments to effectively carry out digestions of materials difficult to digest has made them quite successful in the marketplace. In particular, CEM instruments can carry out digestion successfully at temperatures of at least about 150° C., and potentially as high as 180° C.

The high temperature digestion carried out as a microwave-assisted process, however, requires a much more sophisticated vessel that is typically formed of PTFE for microwave transparency and chemical resistance. The cost of a pressure resistant properly manufactured vessel for microwave assisted digestion tends to preclude these vessels from being used disposably. Additionally, in order to enhance the pressure resistant capabilities, these vessels tend to be used with a reinforcing sleeve that adds structural integrity to the vessel during the digestion; e.g. U.S. Pat. No. 6,086,826.

Metal vessels have their purposes, but in the digestion context the acid contact can also be corrosive and even small amounts of resulting contamination can lead to erroneous results. Quartz is better from a reactivity standpoint (i.e., inert), but tends not to be as safe as polymers at high temperatures, and neither quartz nor metal vessels can incorporate simplified pressure venting systems in the same manner as polymer vessels.

Some digestions can be carried out at room temperature in mineral acid, and some can be carried out at relatively moderate temperatures using open vessels heated by an instrument. As is understood by the skilled person, and the marketplace, however, the boiling point of the acid (or mixture of acids) limits the temperature to which the acids can be raised at atmospheric pressure, and thus limits the digestions that can be successfully accomplished. These modest-temperature heating systems often consist of a heated block with openings into which polyethylene or polypropylene digestion vessels can be inserted. Based on the modest price of these materials, such vessels can be used disposably in many cases.

Accordingly, a functional need and opportunity exists for improved digestions at temperatures higher than conventional lower-end heated systems, but which digestions do not require the superior capabilities (and higher cost) of high-pressure microwave assisted digestion systems.

SUMMARY

In one aspect, the invention is an instrument system for acid digestion. The instrument includes a heating block, a reaction vessel formed of a polymer that is resistant to acid and other chemical attack at temperatures above 150° C. and that has a structure (thickness, etc.) sufficient to withstand pressures above atmospheric, a metal sleeve surrounding the polymeric reaction vessel, and an opening in the block that has a cross-section corresponding to the cross-section of the metal sleeve.

In another aspect the invention is a method for acid digestion. The method includes the steps of inserting a metal-sleeved reaction vessel into an opening in a heating block in which the opening has a cross-section corresponding to the cross-section of the metal sleeve, and in which the reaction vessel is formed of a polymer that is resistant to acid and other chemical attack at temperatures above 150° C. and that has a structure (thickness, etc.) sufficient to withstand pressures above atmospheric, heating the block to a temperature about 50° C. higher than the reaction temperature desired inside the reaction vessels for a time sufficient for the reagents inside the vessels to reach an equilibrium heated temperature based on the temperature of the heated block, holding the sleeved reaction vessel in the heated block for a time sufficient for the contents of the reaction vessel to digest in acid at the equilibrium temperature, removing the heated sleeved reaction vessel from the heating block (the block can stay warm for efficiency), removing the polymeric reaction vessel from the sleeve, and cooling the polymeric reaction vessel until the reaction vessel and its contents reach a safe operating temperature and pressure for opening the reaction vessel at ambient temperatures and pressures.

In another aspect the invention is a method for acid digestion that includes the steps of adding a sample and at least one mineral acid to a pressure-resistant fluoropolymer reaction vessel, closing the reaction vessel with a pressure-resistant cap, positioning the fluoropolymer reaction vessel within a metal sleeve in a sliding and unfastened relationship, and heating the metal sleeve for a time sufficient for the mineral acid to digest the sample in the reaction vessel.

In another aspect, the invention is the combination of a polymeric reaction vessel, a separate metal sleeve surrounding the vessel, a sample inside the reaction vessel and selected from the group consisting of rocks, plant materials, soil, food, pharmaceuticals, plastics, and metals, and a mineral acid inside the reaction vessel and selected from the group consisting of perchloric, chloric, hydrochloric, hydrofluoric, nitric, and sulfuric.

In another aspect, the invention is an instrument system for acid digestion. The instrument system includes a heating block that has a plurality of openings within which items can be heated, a lift frame positioned above the heating block, a vessel alignment rack positioned on the lift frame (in a resting relationship) having a plurality of vessel openings that correspond to the number of the openings in the heating block, a plurality of reaction vessels resting in the vessel alignment rack with portions depending from the vessel alignment rack and through the lift frame, a metal sleeve surrounding each vessel in sliding and unfastened relationship, in which the diameter of the metal sleeve corresponds to the cross-section of the openings in the heating block, and a pair of lift arms for supporting and raising and lowering the lift frame and the vessel alignment rack to correspondingly lift the reaction vessels into and out of the openings in the heating block.

In another aspect, the invention is a combination for acid digestion that includes a heating block defined by a vertically oriented shaft opening, a reaction vessel in the shaft formed of a polymer that is resistant to acid and other chemical attack at temperatures above 150° C. and that has a structure that when closed is sufficient to withstand pressures above atmospheric pressure, and a metal sleeve in the shaft in a defined relationship in which the sleeve covers all of the vessel that is in the shaft and some, but not all, of the vessel above the block and above the shaft. In this combination the block heats lower portions of the sleeve, the vessel, and the vessel contents while the upper sleeved and unsleeved portions of the vessel define cooler and unheated portions within the vessel.

In another aspect, the invention is a combination for acid digestion that includes a cylindrical reaction vessel formed of an acid-resistant polymer and of sufficient strength to withstand pressures above atmospheric pressure and temperatures above the atmospheric boiling point of strong mineral acids, a dynamic pressure cap that seals the mouth of the reaction vessel for opening and then re-closing the vessel to release gas at defined pressures above atmospheric, a metal sleeve around lower portions of the reaction vessel and axially spaced from the dynamic pressure cap to provide radial pressure support and thermal conductivity during heating and cooling, and to define an upper, unsleeved portion of the reaction vessel. A heating block surrounds lowermost portions of the sleeve and the vessel, but not the entirety of the sleeve axially along the vessel to thereby define a sleeved vessel portion in the heating block and a sleeved vessel portion outside of the heating block for encouraging thermal conductivity within the sleeved portion of the reaction vessel during both digestion heating and post-digestion cooling.

The foregoing and other objects and advantages of the invention and the manner in which the same are accomplished will become clearer based on the followed detailed description taken in conjunction with the accompanying drawings.

DETAILED DESCRIPTION

Figure 1:
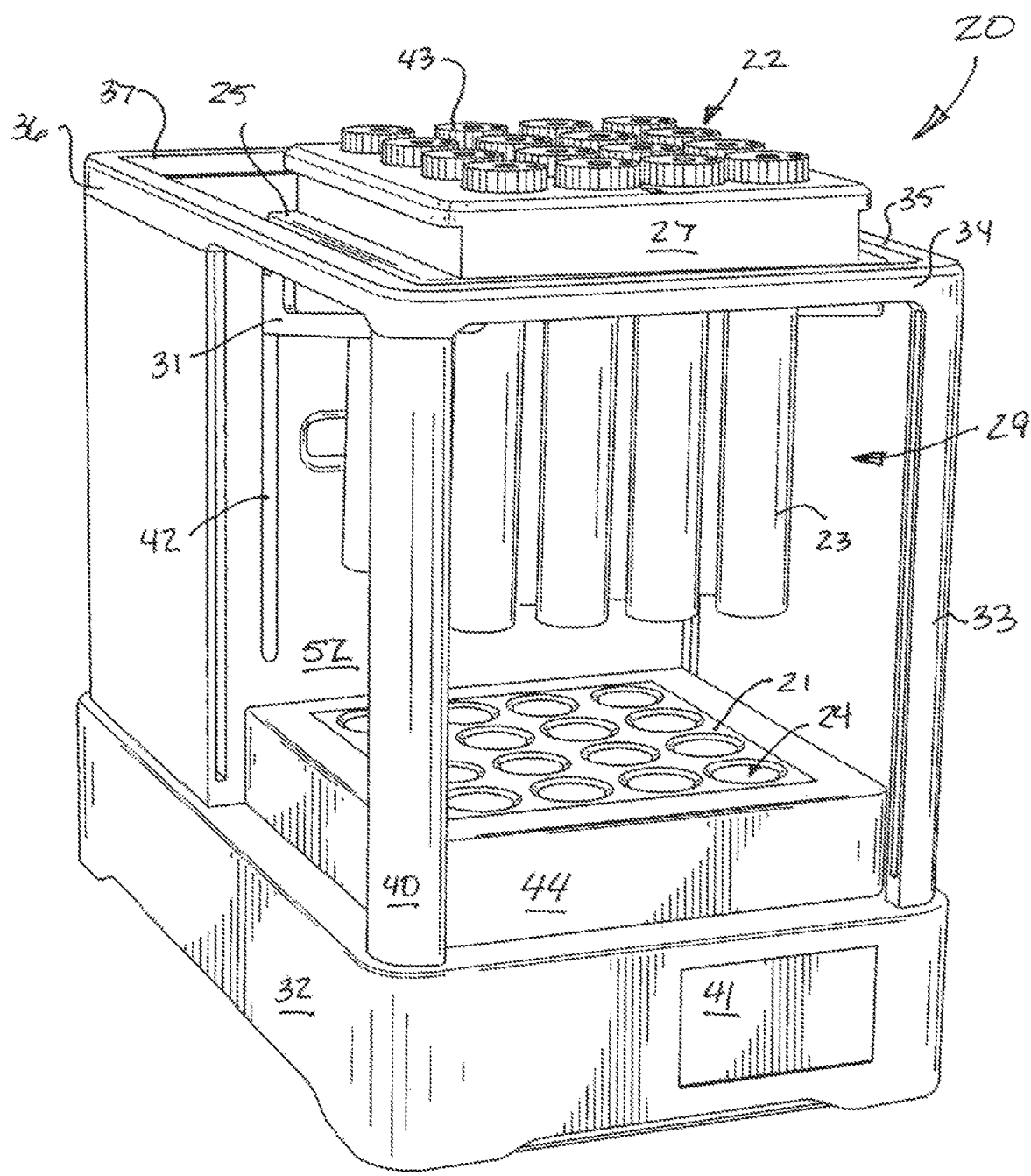
FIG. 1 is a perspective view of the instrument with the reaction vessels raised above the heating block.

FIG. 1 is a perspective view of one embodiment of the digestion instrument according to the present invention, and broadly designated at 20. FIG. 1 illustrates some of the major features of the invention including the heating block 21. A reaction vessel broadly designated at 22 (e.g., FIGS. 3 and 4; a plurality are illustrated in FIG. 1) is formed of a polymer that is resistant to acid and other chemical attack at temperatures above 150° C. and has a structure (thickness, etc.) sufficient to withstand pressures above atmospheric. A metal sleeve 23 surrounds the reaction vessel 22, and the opening 24 in the block 20 (again, FIG. 1 shows a plurality), has a cross-sectional corresponding to the cross-section of the metal sleeve.

FIG. 1 also illustrates a lift frame 25 (See also FIGS. 2 and 9) positioned above the heating block 21 that has a plurality of its own openings 26 (FIG. 9) that correspond to the number and cross-section of the openings 24 in the heating block 21.

A vessel alignment rack 27 is positioned on the lift frame 25 in a resting relationship in this embodiment, and the vessel alignment rack 27 has a plurality of its own openings 30 (FIGS. 8 and 9) that correspond to the number and cross-section of the openings 24 in the heating block 21 and the openings 26 in the lift frame 25.

In the illustrated embodiment, a plurality of the reaction vessels 22 and their sleeves 23 surrounding each reaction vessel are in a sliding and unfastened relationship in which the diameter of the metal sleeve corresponds to the cross-section of the openings 24 in the heating block 21.

A pair of lift arms 31 (one is visible in FIG. 1) supports, and raises and lowers, the lift frame 25 and the vessel alignment rack 27 to correspondingly lift the vessels and sleeves 22, 23 into and out of the openings 24 in the heating block 21.

FIG. 1 also illustrates that the instrument 20 in the illustrated embodiment includes a pedestal 32 and a plurality of housing frame members 33, 34, 35, 36, 37, and 40.

Figure 2:
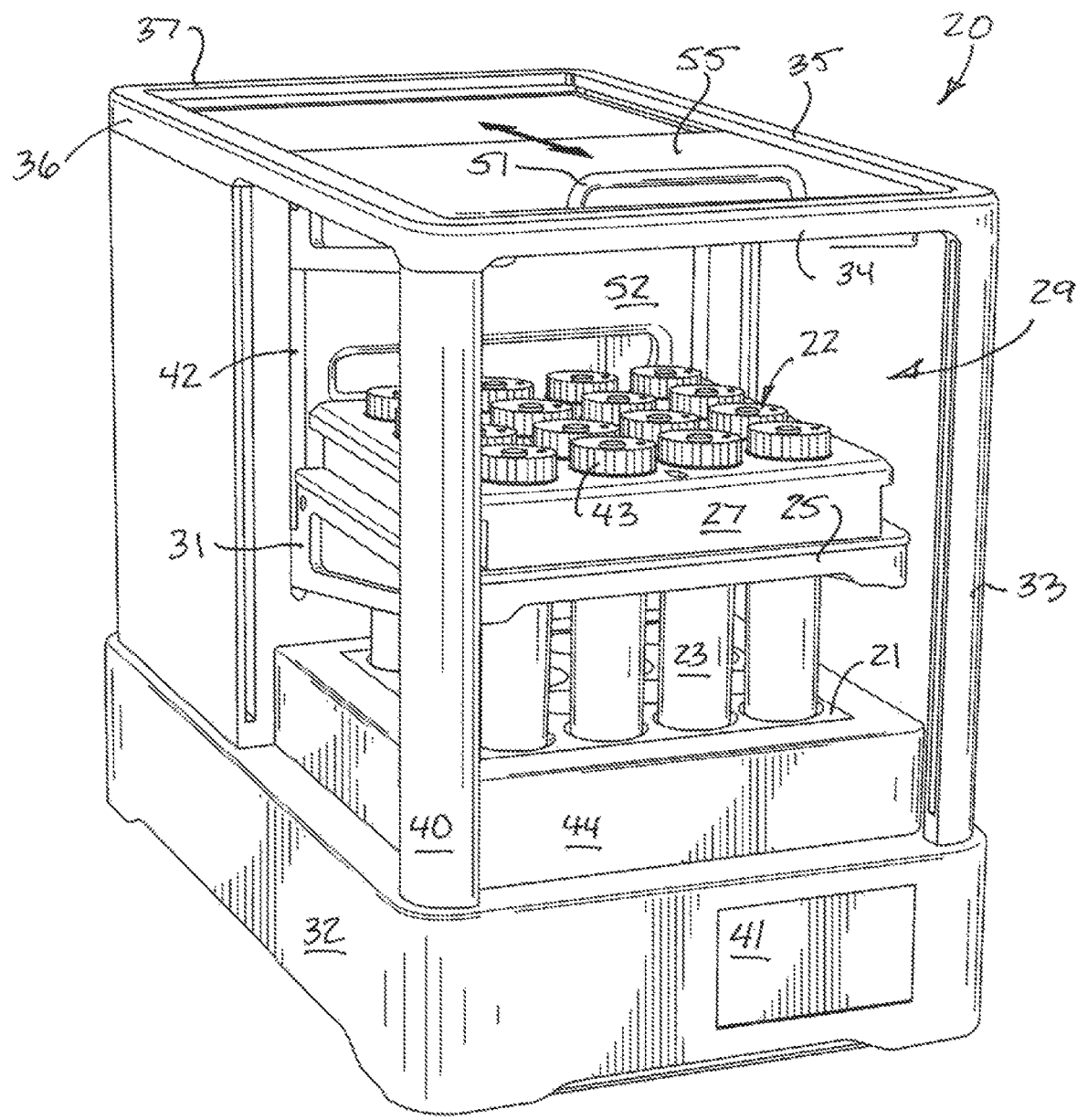
FIG. 2 is a perspective view identical to FIG. 1 but with the reaction vessels lowered into the heating block.

FIGS. 1 and 2 illustrate that the housing frame members 33, 34, and 40, together with the pedestal 32 and the reaction block 21 essentially define a reaction area 29 for the instrument 20. As will be described later with respect to FIG. 8, walls for the reaction area (omitted in FIGS. 1 and 2 for the sake of clarity) can be formed of a transparent acid-resistant material such as polycarbonate, polyester, or another appropriate engineering polymer.

FIG. 1 also illustrates an input output element shown as the touchscreen 41 as well as a channel 42 within which the lift arms 31 reciprocates upwardly and downwardly.

FIG. 1 also shows a block casing 44 surrounding portions of the heating block. In exemplary embodiments the casing is formed of or covered with an acid resistant material, given that acids are the most likely reactants.

As another advantage, the nature of the heating block 21 tends to produce very similar temperatures in all vessels that are inserted at the same time and for the same length of time. Using the instrument, measured digestions to date have typically remained within about 5° C. of one another.

As an added advantage, the sleeve 23 provides excellent heat transfer between the heating block 21 and the fluoropolymer reaction vessel 22. The sleeve 23 also helps maintain the structural integrity of the vessel 22, and prevents ballooning or failure of the reaction vessel 22. If the fluoropolymer vessels were heated directly in the block, and vessels that ballooned significantly would require that the block be cooled—thus increasing cycle time—before vessels could be removed.

Furthermore, metal sleeves can be machined to closer tolerances then polymers in many circumstances. Additionally, during heating, any swelling of the polymer reaction vessel 22 against the sleeve 23 helps increase heat transfer from the block to the acids and samples in the vessel. Finally, the sleeve releases from the block immediately; i.e., as desired rather than after cooling.

Figure 3:
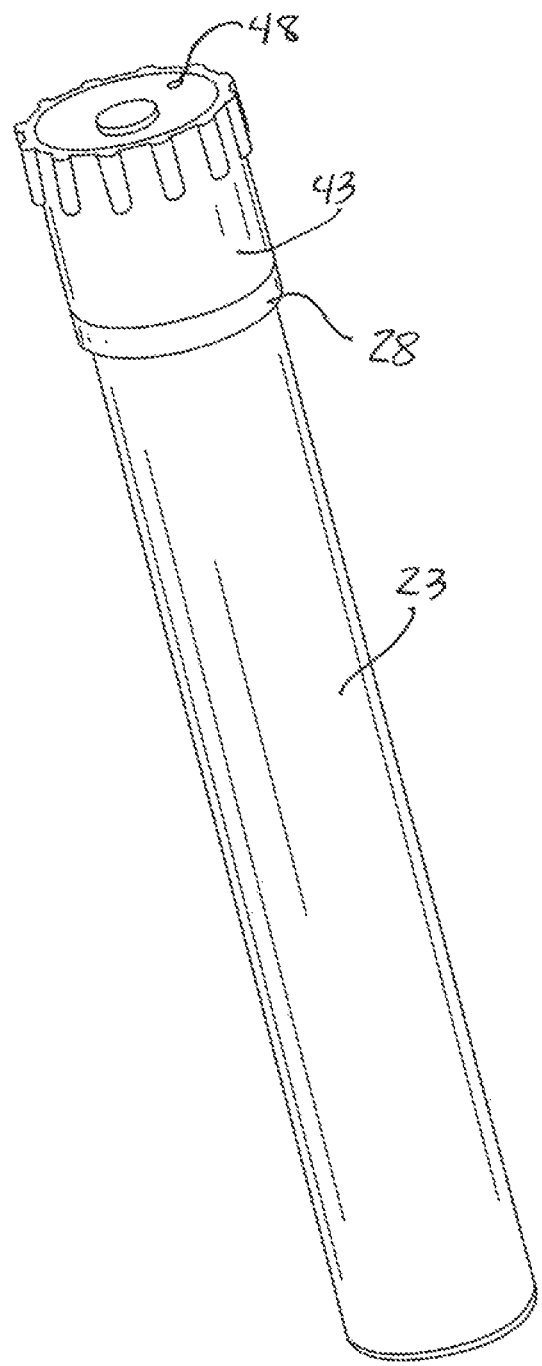
FIG. 3 is a perspective view of a reaction vessel.
Figure 4:
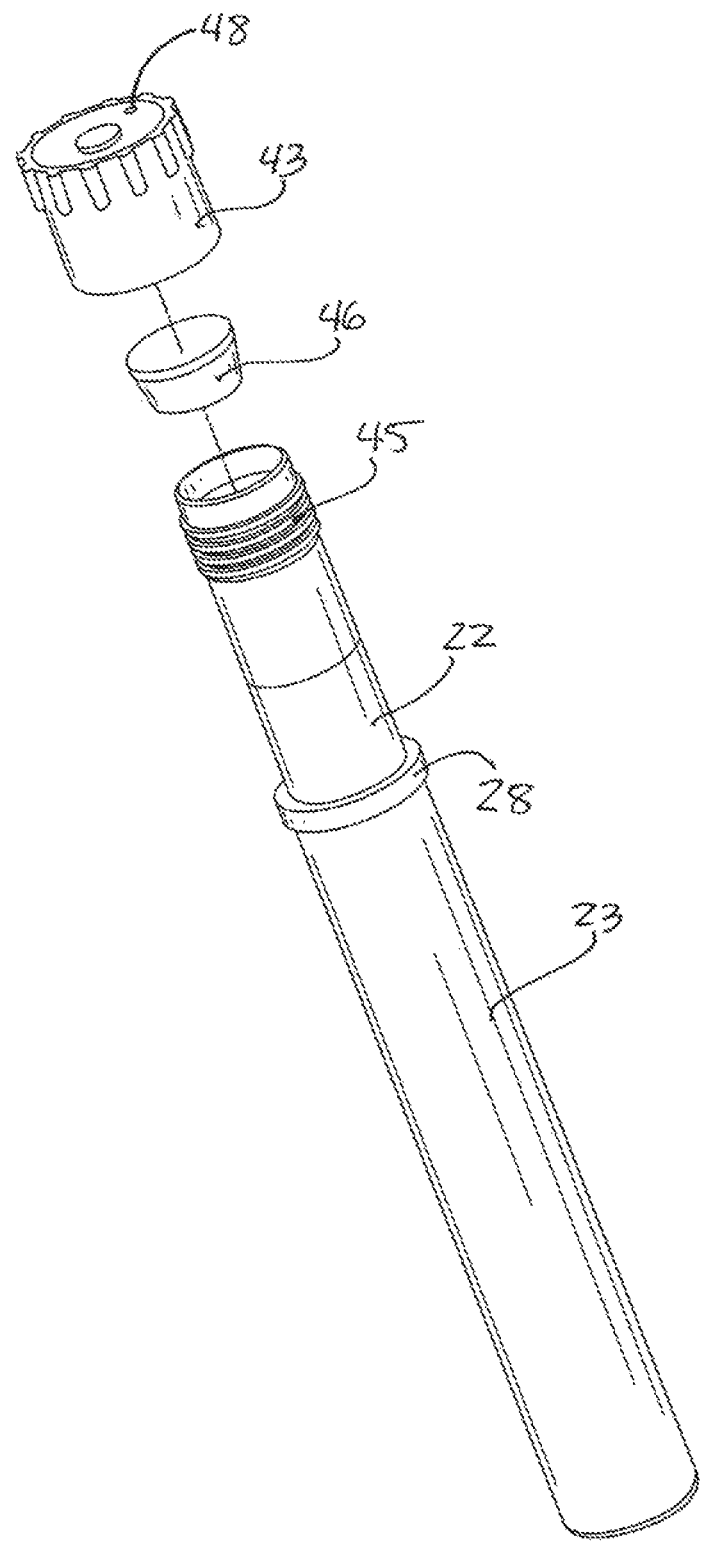
FIG. 4 is an exploded view of a reaction vessel and its liner.

As shown and described in more detail with respect to FIGS. 3 and 4, the reaction vessels 22 each include a respective threaded cap 43 with the cap diameters being larger than the openings 30 in the vessel alignment rack 27 so that the threaded caps 43 support the reaction vessels 22 in the vessel alignment rack 27.

FIG. 2 is another perspective view almost identical to FIG. 1, but illustrating the sleeved vessels 22, 23 in the heating block 21. In particular, FIG. 2 illustrates that, depending upon the size of the reaction vessels 22 and the depth of the openings 24 in the heating block 21, the vessels 22 can be inserted partially into the block rather than totally, thus making the overall size of the instrument 20 more compact. It will be understood that where necessary or desirable, the size of the heating block 21 or the size of the vessels 22 and sleeves 23 can be modified so that the vessels 22 and sleeves 23 are entirely within the heating block 21 when in the lowered position. Such a relationship is, however, optional rather than necessary.

FIGS. 3 and 4 illustrate one embodiment of a reaction vessel 22 in its sleeve 23 along with its threaded closing cap 43. FIG. 3 illustrates these items assembled, and thus only the sleeve 23 and the threaded cap 43 are visible. FIG. 4 accordingly offers more helpful detail.

First, FIG. 4 illustrates an embodiment in which the reaction vessel 22 is cylindrical in cross-section, a geometry that tends to provide excellent radial pressure resistance in many circumstances. For acid digestion the reaction vessel is formed of a fluorinated polymer of which polytetrafluoroethylene (PTFE) is exemplary.

Other fluoropolymers are acceptable depending upon circumstances or as may be desired or necessary. Those skilled in the art can select between and among a number of choices that are either closely related to PTFE or modified in ways that are helpful or necessary for particular reaction circumstances. These polymers can be selected by the skilled person without undue experimentation.

The metal sleeve 23 surrounds the reaction vessel 22 in a sliding relationship and in the illustrated embodiments need not be fixed in any further manner to the vessel 22. The metal sleeve 23 is formed of a metal with a sufficient heat conductivity to raise the temperature of the reagents in the reaction vessel 22 above 150° C. when the sleeve 23 is heated above 200° C.

The vessel sleeves 23 also include a sleeve lip 28 at the sleeve opening (mouth). The sleeve lip 28 (annular in the illustrated embodiment) can engage and rest in either the vessel alignment rack 27 or the lift frame 25. The sleeve lip 28 provides for an appropriate connection and positioning for the sleeve 23 in the context of the block, the lift frame 25 and the alignment rack 27 without requiring that the sleeve 23 be physically fastened to any of these.

FIG. 4 further illustrates that the size relationship between the sleeve 23 and the reaction vessel 22 are such that excellent heat transfer will occur when the sleeve 23 is heated with the reaction vessel 22 therein.

The threaded closing cap 43 engages a set of threads 45 positioned near one end of the vessel 22, and in the illustrated embodiment (and reflecting commercially available vessels from CEM Corporation), further includes a closing plug 46. The nature, detailed structure, and advantages of the vessel 22, its plug 46 and its cap 43 are described herein with respect to FIG. 10. Additionally, U.S. Pat. No. 8,795,608 provides sufficient information for the skilled person and is also incorporated entirely herein by reference.

FIG. 4 illustrates that the vessels described in U.S. Pat. No. 8,795,608 are self-venting under designated elevated pressures, and the small opening 48 best illustrated in FIGS. 3 and 4 is a part of that system. U.S. Pat. No. 8,795,608 is, of course, publicly available, and the skilled person understands the operation of its venting system or similar venting systems.

Because the most typical reaction in the instrument will be acid digestion, in exemplary embodiments the sleeve 23 is formed of aluminum for purposes of heat transfer, cost, availability and lighter weight as compared to other metals. If necessary or desired, the aluminum sleeve 23 can be anodized or coated in a manner that helps increase its resistance to acids in digestion circumstances.

Metal parts—including pipes and valves—lined with fluoropolymers are generally well-known. Nevertheless, for good and proper reasons, such linings are intended and manufactured to be permanent; i.e., the polymer is deposited on and fixed to the metal. In the invention, the metal support is in the form of an independent sleeve from which the fluoropolymer vessel can be removed to cool quickly—thus reducing cycle times—while the block can remain heated.

The combination of the separate vessel 22 and sleeve 23 offer further advantages that will be described with respect to the method aspects of the invention.

Figure 5:
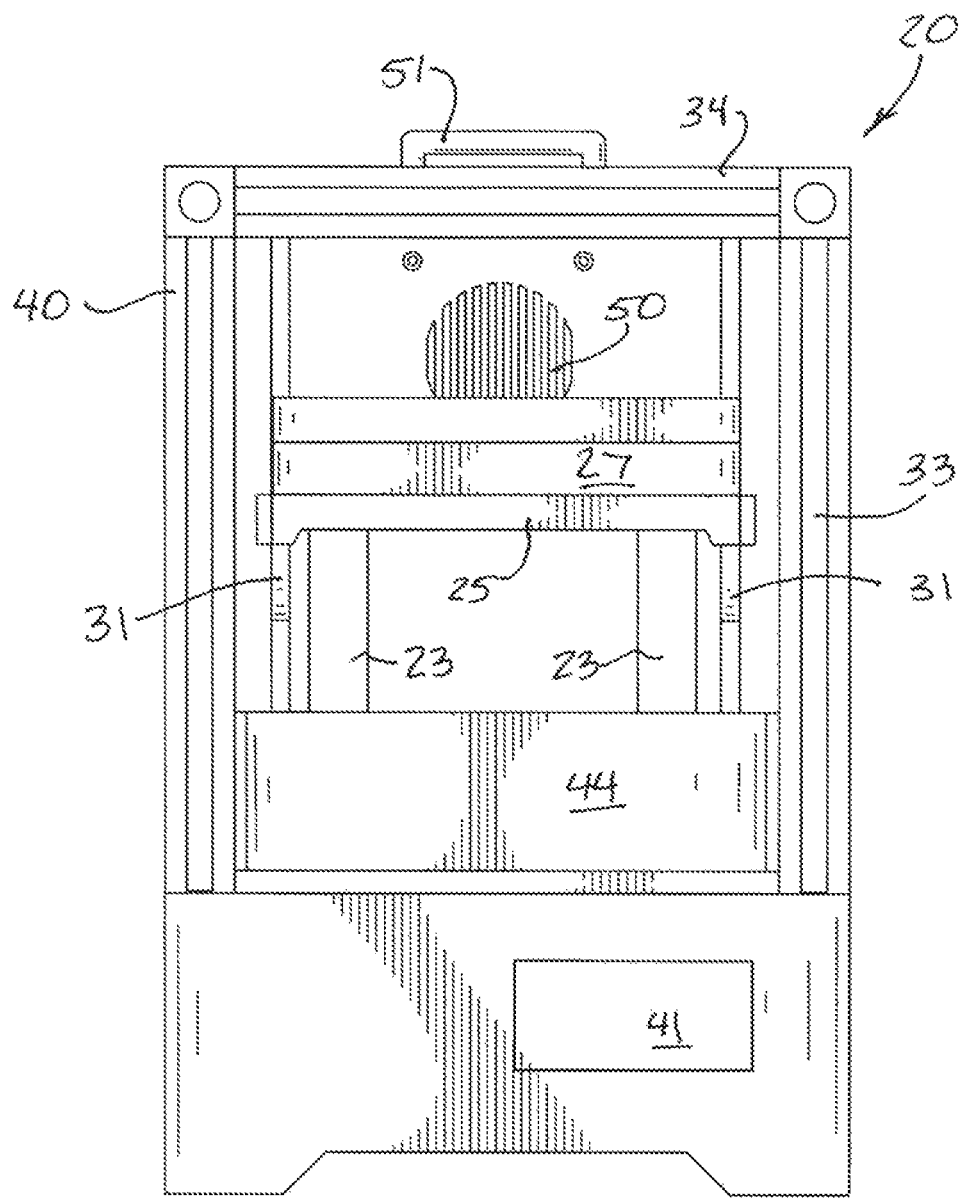
FIG. 5 is a front elevational view of the instrument.

FIG. 5 is a front elevational view of the instrument 20 and illustrates the position of two vessels 22 in their respective sleeves 23 in the vessel alignment rack 27 and in the position lowered into the heating block 21. FIG. 5 also illustrates an exhaust fan opening 50 and a handle for the sliding housing closure (e.g., FIG. 8).

Figure 6:
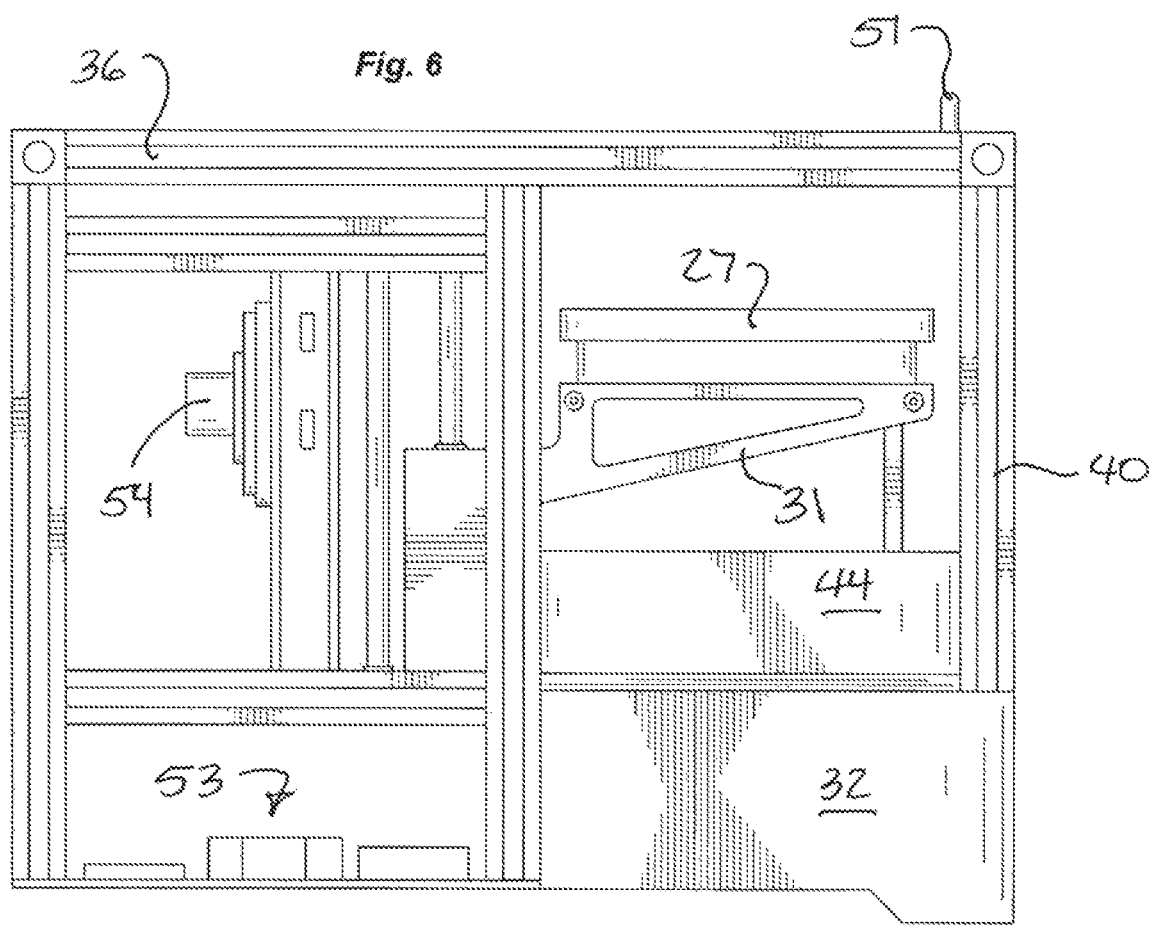
FIG. 6 is a side elevation view of the instrument.

FIG. 6 is a side elevational view illustrating some additional aspects of the instrument. FIG. 6 gives a full view of the lift arm 31 and the vessel alignment rack 27 on the lift frame (not visible in FIG. 6). FIG. 6 also illustrates that in the illustrated embodiment the electronics for the instrument (broadly designated at 53) are positioned rearwardly from the housing portion and separated for both convenience and spillage purposes by the rear wall 52 (FIGS. 1 and 2) in the reaction area 29.

Figure 7:
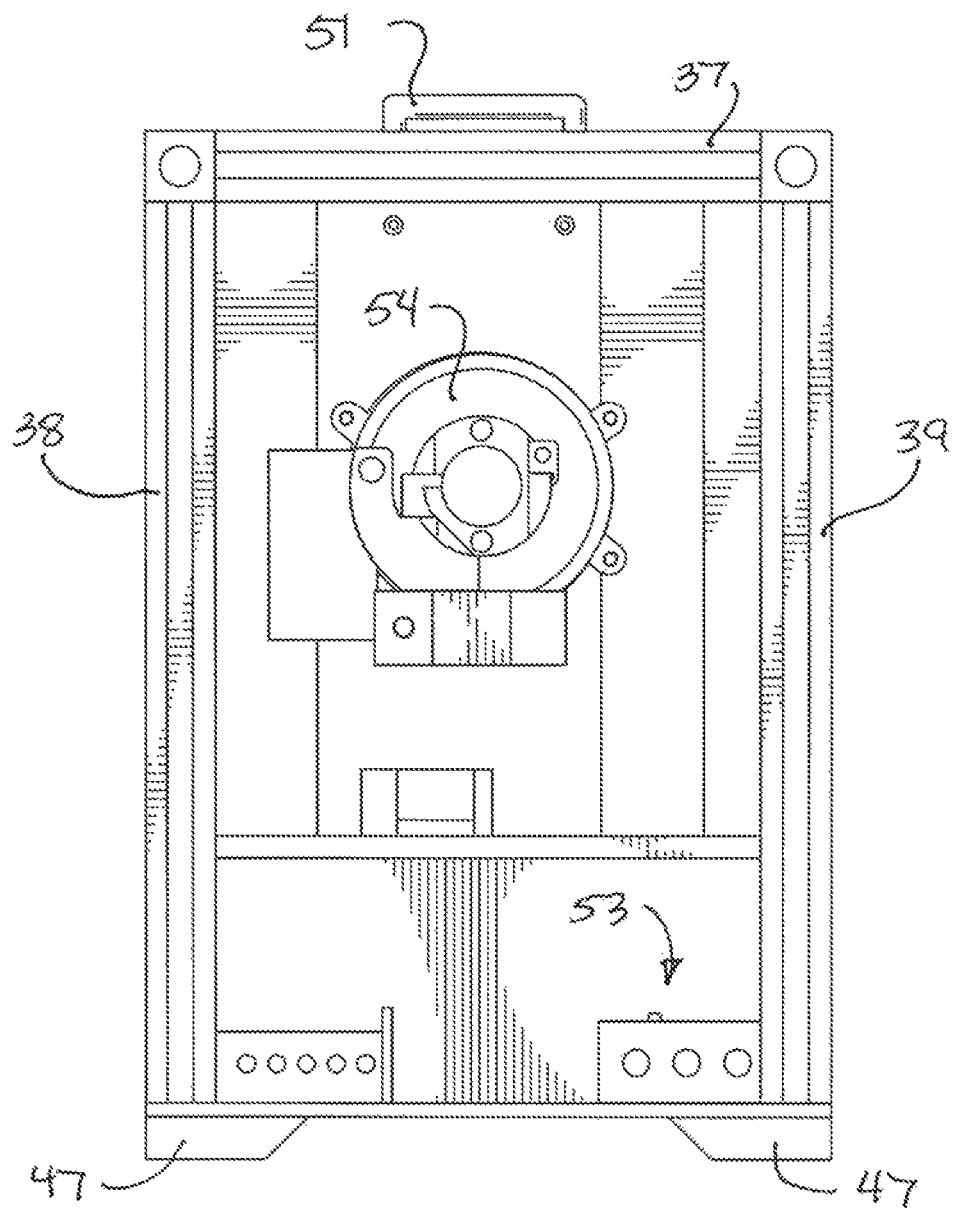
FIG. 7 is a rear elevation view of the instrument.

FIG. 7 is a rear elevation view of the instrument 20 and again illustrates the electronics 53 and the housing closure handle 51. FIG. 7 offers details of the exhaust fan 54 for which the opening 50 was illustrated in FIG. 5. In many circumstances, the instrument will either be operated within, or the exhaust fan will be connected to, a fume hood or similar arrangement for any required or desired safety purposes.

FIG. 7 also illustrates the rear housing frame members 38 and 39 and the small pedestal feet 47 on the pedestal 32.

Figure 8:
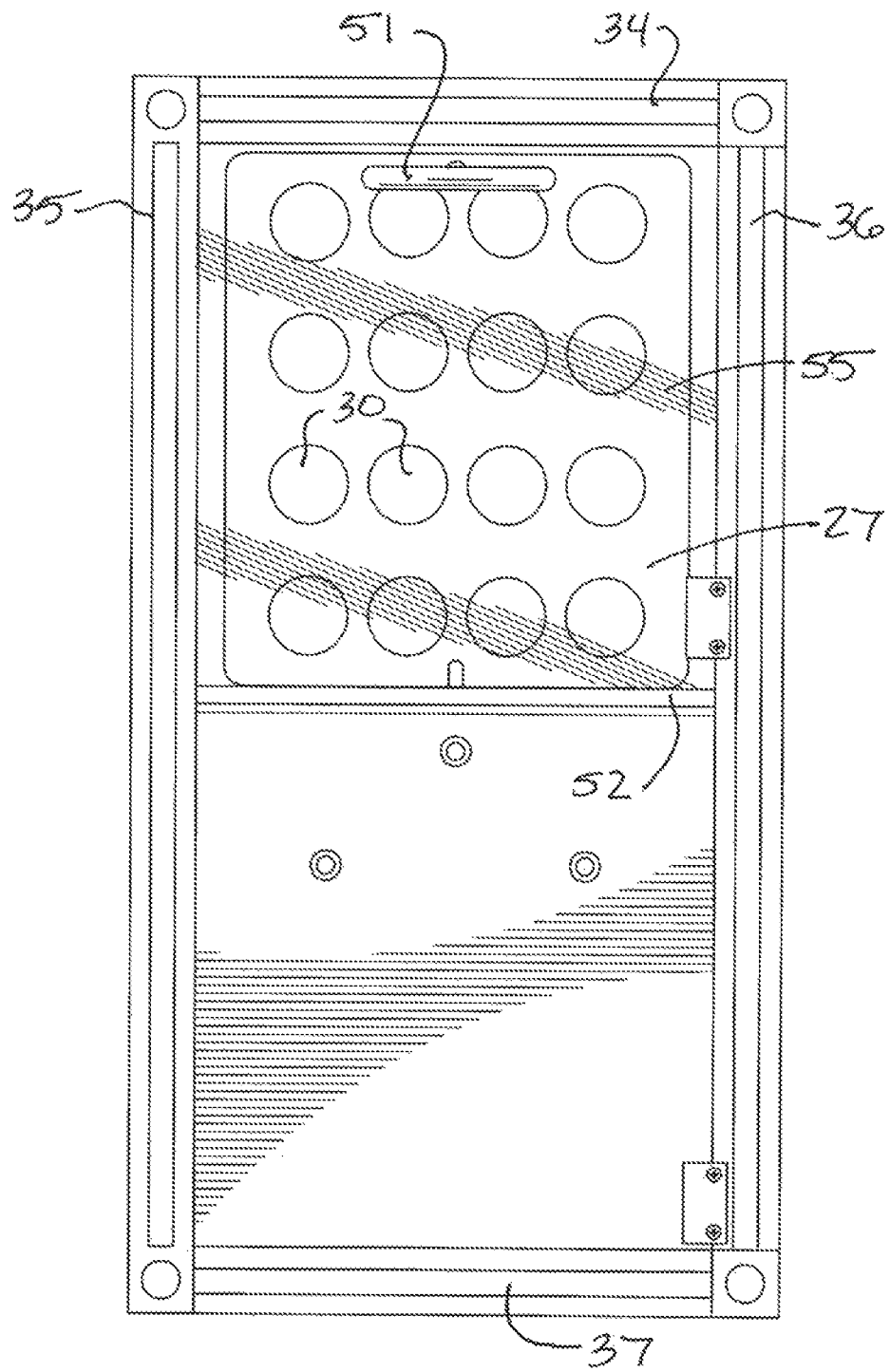
FIG. 8 is a top plan view of the instrument.

FIG. 8 is a top plan view of the same embodiment of the digestion instrument 20. In particular, FIG. 8 illustrates that the top of the reaction area (reference) can be closed as needed or desired by sliding a cover or lid 55 which in the illustrated embodiment is moved manually using the handle 51. In the illustrated embodiment, the sliding housing lid 55, along with the front wall 56 and the side walls 57 of the reaction area 29 are formed of a transparent polymer, of which engineering grade polycarbonate, polyester or other similar choices are appropriate. The skilled person can make an appropriate selection based on a desired combination of transparency strengths and similar factors.

Figure 9:
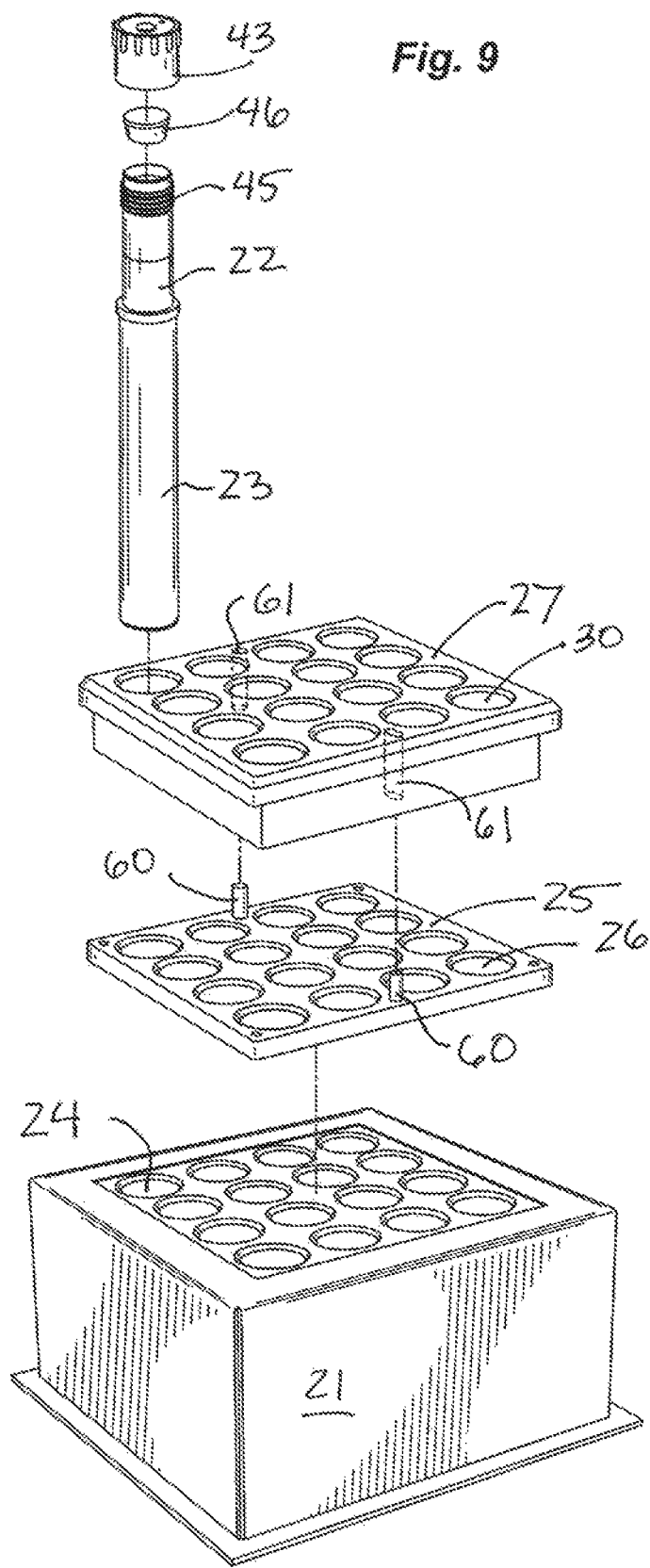
FIG. 9 is an exploded view of the heating block, the lift frame, the vessel alignment rack, a vessel liner, and the vessel.

FIG. 9 is an exploded view of the heating block 21, the lift frame 25, the vessel alignment rack 27, a vessel sleeve 23 and a reaction vessel 22 with its threaded cap 43.

FIG. 9 illustrates that the lift frame 25 includes at least two alignment or registration pins 60 along with corresponding registration openings 61 in the vessel alignment rack 27.

Turning to some of these items in slightly more detail, the heating block 21 is best formed of a material that provides rapid heat transfer to the sleeve 23 when the sleeve 23 is in the corresponding opening 24 in the heating block 21. As another factor, because acid digestion is the reaction for which the instrument 20 is particularly helpful, in exemplary embodiments the heating block 21 is formed of a material that is also resistant to acid attack. Such materials can be selected without undue experimentation by those of ordinary skill in this art and in a representative embodiment the heating block 21 is formed of graphite, a material that that helps meet both of these objectives.

Although the best heating relationship is obtained when the cross-section of the sleeve 23 and that of the openings 24 in the block 21 are complementary, and although FIG. 9 and the other drawings illustrate the openings 30 in the alignment rack 27 and the openings 26 in the lift frame 25 as likewise corresponding to the cross-section of the liner 23, it will be understood that functionally the lift frame 25 and the vessel alignment rack 27 need to position vessels 22 and their sleeves 23 in a manner that permits (if desired) an automated (mechanical; robotic) reciprocal movement of the vessels 22 and their sleeves 23 into and out of the openings 24 in the block 21. Such movement does not absolutely require that the openings 30 in the vessel alignment rack and the opening is 26 in the lift frame 25 match the cross-section of the liners 23 and the block openings 24. Other geometric or structural arrangement will work, provided that either a single vessel or the desired plurality of vessels can be moved into and out of the heating block 21 using the alignment rack 27 and the lift frame 25.

Figure 10:
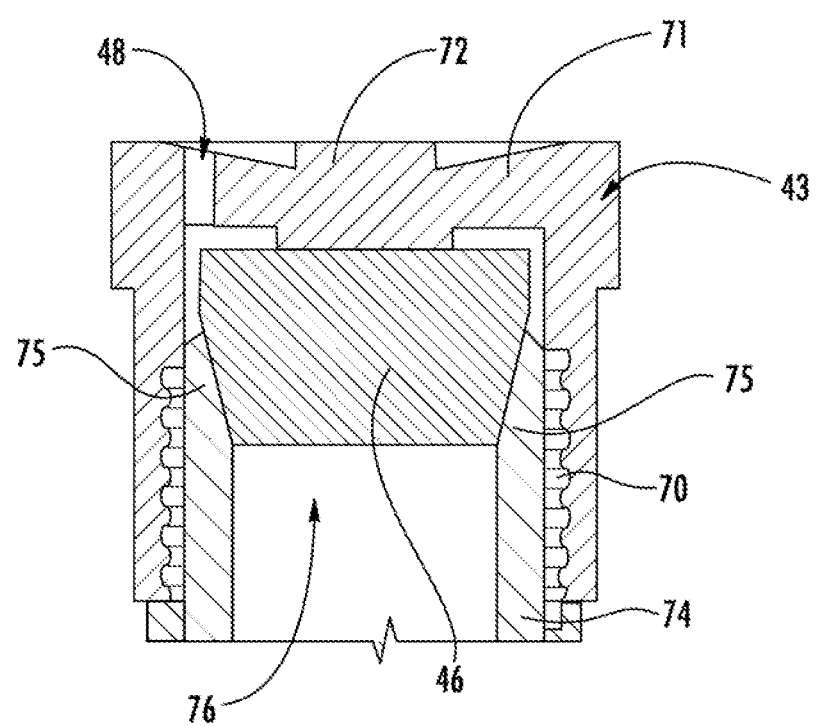
FIG. 10 is a cross sectional view of a dynamic pressure release and resealing cap according to the invention.

FIG. 10 is a cross-sectional view of the top portion of the reaction vessel 22 (e.g., FIGS. 3 and 4) and further illustrating an exemplary dynamic sealing structure, and in particular the operation of the threaded closing cap 43. The closing cap 43 includes the threads 70, a flexible portion 71, a load-bearing portion 72, and a gas release opening 48.

In this embodiment, the annular walls 74 of the reaction vessel 22 form a tapered opening 75 at the mouth 76 of the vessel 22. The solid floating plug 46 has a frustum-shaped portion that engages the tapered opening 75. As used herein, the term "floating" refers to the absence of mechanical advantage with respect to any other single part.

In operation, the closing cap 43 bears against the floating plug 46 to firmly seat the plug 46 in the tapered opening 75 at the mouth of the reaction vessel 22. When the gas pressure inside the vessel 22 exceeds the flexing or tensing limit of the flexible portion 71 of the threaded closing cap 43, the flexible portion 71 bends slightly. This allows the floating plug 46 to correspondingly disengage slightly which in turn allows gases to escape through the gas opening 48 and thus reduce the gas pressure in the reaction vessel 22. When gas pressure drops below the force required to bend the flexible portion 71, the plastic memory of the flexible portion 71 and the load-bearing portion 72 return the floating plug 46 to an engaged, pressure-sealing relationship with the tapered opening 75 in the mouth 76 of the reaction vessel 22.

Expressed in an alternative fashion, the invention is a combination for acid digestion in which the heating block 21 is defined by one, or a plurality, of vertically oriented shafts (or openings) 24. The reaction vessel 22 is in the shaft 24 and the reaction vessel is formed of the polymer that is resistant to acid and other chemical attack at temperatures above 150° C. and that has a structure that when closed is sufficient to withstand pressures above atmospheric pressure. The metal sleeve 23 and the shaft (opening) 24 in the heating block 21 is in a defined relationship in which the sleeve 23 covers all of the vessel 22 that is in the shaft 24 and some, but not all of the vessel 22 that is above the block 21 and above the shaft 24. As a result, the block 21 heats lower portions of the sleeve 23, the vessel 22, and the vessel contents while the upper sleeved and unsleeved portions of the vessel 22 define cooler and unheated portions within the vessel.

In exemplary embodiments the reaction vessel 22 includes the dynamic closure 43 described herein (or an equivalent dynamic closure) that will release pressure and reclose at a defined pressure point.

It will be understood that in this embodiment, the described vessel and sleeve can be incorporated with the other features Illustrated in FIGS. 1-10 and described herein to some greater or lesser extent as may be desired or necessary in given circumstances. These permutations therefore, will not be repeated merely for the sake of repetition.

In exemplary embodiments the majority of the axial length of the metal sleeve 23 and of the sleeve reaction vessel 22 are above the heating block 21, and in these embodiments, about one third of the metal sleeve 23 is in the shaft 24 in the block 21 and about two thirds of the metal sleeve 23 is above the block 21.

In another aspect, the invention can be expressed as a combination for acid digestion that includes the cylindrical reaction vessel 22 formed of the acid resistant polymer and having sufficient strength to withstand pressures above atmospheric pressure and temperatures above the atmospheric boiling point of strong mineral acids. A dynamic pressure cap 43 seals the mouth of the reaction vessel 22 for opening and then re-closing the vessel 22 to release gas at defined pressures above atmospheric. A metal sleeve 23 surrounds lower portions of the reaction vessel 22 and is axially spaced from the dynamic pressure cap 43 to provide radial pressure support and thermal conductivity during heating and cooling and to define an upper unsleeved portion of the reaction vessel 22. The heating block 21 surrounds lowermost portions of the sleeve 23 and the vessel 22, but not the entirety of the metal sleeve 23 axially along the vessel 22 to thereby define a sleeved vessel portion in the heating block 21 and a sleeved vessel portion outside of the heating block 21 for encouraging thermal conductivity within the sleeved portion of the reaction vessel 22 during both digestion heating and post-digestion cooling.

As used herein the "defined pressure point" does not need to be an exact number; it merely needs to be sufficient so that the acids will reach an above-atmospheric boiling point temperature before the generated gas pressure opens the closing cap 43. The flexing can be defined by the size (e.g., diameter and thickness) of the flexible portion 71 and to the extent this can be closely engineered, then "defined" can represent an exactly predicted pressure or pressure range. In most other cases, however, a flexing portion that is stiff enough to maintain working pressure is sufficient and the exact force required to move it need not be a known quantity.

As in the other described embodiments, in exemplary cases, the majority of the axial length of the metal sleeve 23 and of the sleeved reaction vessel 22 are above the heating block with a ratio of about one third of the metal sleeve 23 in the shaft opening 24 in the block 21 and about two thirds of the metal sleeve 23 above the block 21 being illustrated. It will be understood that these ratios are exemplary rather than limiting.

In the same manner, in this embodiment the combination can include a heating block with a plurality of the shaft openings 24 and a sleeved vessel in one or more—and in many cases each—of the respective shaft openings 24 in the block 21.

It will be understood that in this embodiment, the described vessel and sleeve can be incorporated with the other features Illustrated in FIGS. 1-10 and described herein to some greater or lesser extent as may be desired or necessary in given circumstances. These permutations therefore, will not be repeated merely for the sake of repetition.

In a method context, the invention includes the steps of acid digestion that include adding a sample and at least one mineral acid to a pressure resistant fluoropolymer reaction vessel; closing the reaction vessel with a pressure resistant cap; positioning the fluoropolymer reaction vessel within a metal sleeve in a sliding and unfastened relationship, and then heating the metal sleeve for a time sufficient for the mineral acid to digest the sample in the reaction vessel.

Expressed in more detail, the method comprises inserting a metal-sleeved reaction vessel into an opening in the heating block in which the opening has a cross-section corresponding to the cross-section of the metal sleeve and in which the reaction vessel is formed of a polymer that is resistant to acid and other chemical attack at temperatures above 150° C. and that has a structure (thickness, etc.) sufficient to withstand pressures above atmospheric pressure.

The method then comprises heating the block to a temperature about 50° higher than the reaction temperature desired inside the reaction vessels for a time sufficient for the reagents inside the vessels to reach an equilibrium heated temperature based on the temperature of the heated block. The sleeved reaction vessels are then held in the heated block for a time sufficient for the contents of the reaction vessel to digest in acid at the equilibrium temperature.

The heated sleeved reaction vessel is then removed from the heating block and the polymeric vessel is removed from the sleeve. These aspects of the structure and method increase process efficiency. First, because the sleeved reaction vessels are removed from the heating block when digestion is complete, the block can remain heated between experiments or runs, thus providing greater speed and thermal efficiency for the next and succeeding reactions. Because the polymer reaction vessel can be removed from the metal sleeve, the vessel and its contents can be cooled outside of the sleeve (and thus more quickly than when in contact with the metal sleeve) until the reaction vessel and its contents reach a safe operating temperature (typically but not universally 60° C.) for opening the reaction vessel at ambient temperatures and pressures. Alternatively, because the metal sleeve conducts heat efficiently, the raised vessels in their sleeves will cool almost as quickly as will un-sleeved vessels.

As the instrument embodiments illustrate, a plurality of such digestions can be carried out concurrently in a plurality of sleeved vessels in a single block, thus adding to the overall speed and efficiency.

Follow-up analysis can then be carried out as is normally case with digestion from analytical techniques such as ICP, ICP-MS, AE or AA.

An exemplary run would include the steps of inserting the sleeved vessels into the heating block, heating the vessels for 15 minutes so that the contents reach the desired temperatures (about 150° C.), holding the vessels at temperature in the block for about 10 minutes (for full digestion), removing the vessels from the block, and passively or proactively cooling the vessels for about 15 minutes to allow the contents to reach a temperature (about 60° C.) and pressure (about 1.1 atm) at which the vessels can be easily and safely opened.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. An instrument system for acid digestion, comprising:
   a heating block;
   a reaction vessel formed of an acid-resistant polymer and that has a thickness sufficient to withstand pressures above atmospheric;
   a metal sleeve surrounding said polymeric reaction vessel;
   a shaft opening in said heating block having a radial cross-section corresponding to the radial cross-section of said metal sleeve.

2. An instrument system according to claim 1 wherein said reaction vessel is formed of a fluorinated polymer.

3. An instrument system according to claim 1 wherein said reaction vessel is formed of polytetrafluoroethylene.

4. An instrument system according to claim 1 wherein said reaction vessel and said sleeve are cylindrical and the cross-section of said opening in said heating block is cylindrical.

5. An instrument system according to claim 1 wherein said heating block is formed of a material that is resistant to acid attack and that provides heat transfer to said sleeve when said sleeve is in said corresponding shaft opening in said heating block.

6. An instrument system according to claim 5 wherein said heating block is graphite with a plurality of said shaft openings for concurrently receiving and heating a plurality of sleeved reaction vessels.

7. The combination of:
   the instrument system according to claim 1; and
   a sample inside said reaction vessel and selected from the group consisting of rocks, plant materials, soil, food, pharmaceuticals, plastics, and metals; and
   a mineral acid inside said reaction vessel and selected from the group consisting of perchloric, chloric, hydrochloric, hydrofluoric, nitric, and sulfuric.

8. An instrument system for acid digestion according to claim 1 and further comprising:
   a lift frame positioned above said heating block;
   a vessel alignment rack positioned on said lift frame having a plurality of vessel openings that correspond to the number of said openings in said heating block;
   a plurality of said reaction vessels and corresponding metal sleeves resting in said vessel alignment rack with lower axial portions depending from said vessel alignment rack and through said lift frame; wherein said metal sleeve surrounding each vessel is in sliding and unfastened relationship with said reaction vessel;
   a plurality of said shaft openings in said heating block, wherein the radial cross-sections of said metal sleeves corresponds to the radial cross-sections of said shaft openings in said heating block; and
   a pair of lift arms for supporting and raising and lowering said lift frame and said vessel alignment rack to correspondingly lift said vessels into and out of said shaft openings in said heating block.

9. An instrument system according to claim 8 further comprising threaded caps on said vessels and in which in which the diameters of said threaded caps are larger then said openings in said vessel alignment rack so that said threaded caps support said reaction vessels in said vessel alignment rack.

10. An instrument system according to claim 8 wherein said metal sleeves are coated with a material that provides a greater acid resistance then the bare metal.

11. An instrument system according to claim 8 wherein:
    said lift frame includes a plurality of alignment pins;
    said vessel alignment rack comprises a corresponding plurality of alignment openings corresponding to said alignment pins so that said vessel alignment rack can register properly upon said lift frame;
    said lift frame has a plurality of vessel openings that correspond to the number and radial cross-section of said vessel openings in said vessel alignment rack and in said heating block.

12. A combination for acid digestion comprising:
    a heating block having a shaft opening corresponding to the shape and size of a reaction vessel in said shaft opening formed of an acid-resistant polymer and having a thickness sufficient to withstand pressures above atmospheric; and
    a metal sleeve in said shaft opening in a defined relationship with said reaction vessel and said shaft opening such that the sleeve covers all of the axial length of said reaction vessel that is in said shaft opening and some, but not all, of axial length of said reaction vessel above said block and above said shaft opening; so that the block heats lower portions of the sleeve, the vessel, and the vessel contents while the upper sleeved and unsleeved portions of the vessel define cooler and unheated portions within the vessel.

13. A combination according to claim 12 wherein said reaction vessel further comprises:
    a tapered opening at its mouth that is sealed by a solid floating plug with a frustum-shaped portion that rests in said tapered opening;
    a dynamic closure cap that fits over said plug and engages the mouth of said reaction vessel and bears against said plug to firmly seat said plug in said tapered opening and that includes a flexible portion that bends slightly when said floating plug disengages from said tapered opening to release pressure at a defined pressure point above atmospheric and then re-closes at a defined pressure point; and
    wherein the majority of the axial length of said metal sleeve and of said sleeved reaction vessel are above said heating block.

14. A combination according to claim 12 and further comprising:
    a plurality of said shaft openings in said heating block; and
    a metal sleeve in one or more of said respective shaft openings in said defined relationship with one said reaction vessel and said shaft opening.

15. A combination for acid digestion according to claim 13 wherein:
    said reaction vessel is cylindrical and formed of an acid-resistant polymer and of sufficient strength to withstand pressures above atmospheric pressure and temperatures above the atmospheric boiling point of strong mineral acids; and
    said metal sleeve is around the lower axial portions of said reaction vessel and is axially spaced from said dynamic pressure cap to provide radial pressure support and thermal conductivity during heating and cooling, and to define an upper, unsleeved portion of said reaction vessel; and
    said combination further comprising:
    a heating block surrounding the lowermost axial portions of said metal sleeve and said reaction vessel to thereby define a sleeved reaction vessel portion in said heating block and a sleeved reaction vessel portion outside of said heating block for encouraging thermal conductivity within the sleeved portion of said reaction vessel during both digestion heating and post-digestion cooling.

16. An instrument system according to claim 8 wherein each said metal sleeve includes an annular sleeve lip at the sleeve mouth so that said annular lip engages the mouth of its corresponding vessel opening in said vessel alignment rack so that said annular lip supports said metal sleeve in said cylindrical vessel opening.

* * * * *